(12) United States Patent
Burg et al.

(10) Patent No.: US 6,456,699 B1
(45) Date of Patent: Sep. 24, 2002

(54) WEB-BASED GENERATION OF TELEPHONY-BASED INTERACTIVE VOICE RESPONSE APPLICATIONS

(75) Inventors: Frederick Murray Burg, West Long Branch; Joseph DeSimone, Freehold, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/201,180

(22) Filed: Nov. 30, 1998

(51) Int. Cl.[7] .......................... H04M 1/64; H04M 3/42; H04M 3/00

(52) U.S. Cl. ................ 379/88.17; 379/67.1; 379/88.13; 379/201.03; 379/265.09; 379/266.07; 379/908

(58) Field of Search ...................... 379/67.1, 76, 88.01, 379/88.04, 88.13, 88.14, 88.15–88.17, 88.18, 88.22, 88.23, 88.24, 88.25, 93.09, 93.11, 93.12–93.17, 100.01, 100.13, 102.03, 201, 213, 216, 900, 902, 908, 265.09, 265.02, 266.07, 201.01, 201.03, 201.12; 704/270, 271, 260, 290, 275; 707/218, 501; 709/513, 531

(56) References Cited

U.S. PATENT DOCUMENTS

| | | | |
|---|---|---|---|
| 5,179,585 A | 1/1993 | MacMillan, Jr. et al. ...... 379/88 |
| 5,416,830 A | 5/1995 | MacMillan, Jr. et al. ...... 379/88 |
| 5,530,852 A | * 6/1996 | Meske, Jr. et al. ........... 395/600 |
| 5,572,643 A | * 11/1996 | Judson ........................ 395/793 |
| 5,588,044 A | 12/1996 | Lofgren et al. ............... 379/67 |
| 5,721,908 A | 2/1998 | Lagarde et al. .............. 395/610 |
| 5,737,592 A | 4/1998 | Nguyen et al. .............. 395/604 |
| 5,742,670 A | * 4/1998 | Bennett ....................... 379/142 |
| 5,742,762 A | 4/1998 | Scholl et al. ............. 395/200.3 |
| 5,752,246 A | 5/1998 | Rogers et al. ................. 707/10 |
| 5,761,662 A | 6/1998 | Dasan ........................ 707/10 |
| 5,761,673 A | 6/1998 | Bookman et al. ........... 707/104 |
| 5,768,581 A | 6/1998 | Cochran ..................... 395/615 |
| 5,778,367 A | 7/1998 | Wesinger, Jr. et al. ........ 707/10 |
| 5,793,966 A | 8/1998 | Amstein et al. ....... 395/200.33 |
| 5,850,433 A | * 12/1998 | Rondeau ..................... 379/201 |
| 5,884,032 A | * 3/1999 | Bateman et al. ....... 395/200.34 |
| 5,884,262 A | * 3/1999 | Wise et al. ................. 704/270 |
| 5,953,392 A | * 9/1999 | Rhie et al. ................ 379/88.13 |
| 5,960,073 A | * 9/1999 | Kikinis et al. ............. 379/265 |
| 5,991,394 A | * 11/1999 | Dezonno et al. ............ 379/265 |
| 6,046,762 A | * 4/2000 | Sonesh et al. ................. 348/16 |
| 6,134,235 A | * 10/2000 | Goldman et al. ........... 370/352 |
| 6,192,111 B1 | * 2/2001 | Wu .......................... 379/88.13 |
| 6,233,318 B1 | * 5/2001 | Picard et al. ............. 379/88.17 |

* cited by examiner

*Primary Examiner*—Allan Hoosain (57) ABSTRACT

A computer system and method for analysis and translation of Web on-line menu architectures to Interactive Voice Response (IVR) menu architectures. The system analyzes Uniform Resource Location (URL) links in HyperText Markup Language (HTML) documents that comprise the Web menus and develops corresponding IVR menus. Once the system has developed a validated IVR menu architecture, the system supports both on-line Web users and IVR users with a common set of structured information databases. The system and method also supports analysis and translation of IVR menu architectures to support Web on-line users. The common information databases contain the IVR and Web menu architectures as well as product specifications and prices.

10 Claims, 9 Drawing Sheets

WEB-BASED GENERATION OF TELEPHONY-BASED INTERACTIVE VOICE RESPONSE APPLICATIONS

BACKGROUND OF THE INVENTION

1. Field of the Invention

The invention relates generally to the field of database manipulation and more particularly to the field of structured databases such as used by on-line Web-based application, structured databases by interactive voice response applications and shared or common use of those structured database.

2. Description of the Related Art

The World Wide Web (WWW) or "the Web" provides a computer user with electronic access to documents located on data servers throughout the world. The standard document format for the Web is HyperText Markup Language (HTML). HTML documents can be static or dynamic. Static HTML documents contain all information required to generate the Web page.

Dynamic HTML documents contain a shell for the Web page, but dynamically insert information into the shell at the time a user links to the HTML document or modifies information in a document. These characteristics of dynamic HTML are described by Isaacs S., *Inside Dynamic HTML*, Microsoft Press, 1997, which is incorporated herein by reference. Dynamic Web pages are also described in U.S. Pat. No. 5,761,673 issued to Bookman et al which is incorporated herein by reference. Use of relational databases over the Internet, which can be an integral part of dynamic HTML is described in U.S. Pat. No. 5,737,592 issued to Nguyen et al which is incorporated herein by reference.

The concept of providing interactive voice response (IVR) to telephone calls is also known. IVR provides automated response to a customer by providing prompts and detecting customer responses to the prompts through either keypad entries or spoken words. IVR is described in a number of patents, including U.S. Pat. No. 5,588,044 to Lofgren et al.; U.S. Pat. No. 5,678,002 to Fawcett et al; and 5,493,608 to O'Sullivan, the disclosures of which are incorporated herein by reference.

Both Web and IVR systems use menu structures and structured databases to organize the customer interaction and control access to information. When Web and IVR systems have similar objectives, there can be substantial similarity in the menu structures and structured database of each system.

There is a need to relate the menu structures and structured database information supporting on-line Web users and IVR users.

BRIEF SUMMARY OF THE INVENTION

An objective is to provide a computer method comprising the steps of identifying a structured database that supports on-line users as suitable for interactive voice response; analyzing the structured database; and generating an interactive voice response menu based on the database analysis. The menu is usable for interactive voice response. The structured database includes HTML documents and scripts which support the on-line users.

Another objective is to provide a computer method comprising the steps of identifying a structured database that includes hypertext mark-up language documents and supports on-line users as suitable for interactive voice response; analyzing the structured database; generating an interactive voice response menu based on the database analysis; and using the menu to support caller interaction with the database during a communication conducted with interactive voice response.

Another objective is to provide a computer method comprising the steps of communicating using interactive voice response; and responsive to the recognized voice, providing interactive choices derived from a structured database, the structured database supporting at least the interactive choices and on-line users. The structured database includes HTML documents and scripts and the structured database supports the on-line users through a Web browser.

Another objective is to provide a computer method comprising the steps of communicating using interactive voice response; and responsive to the recognized voice, providing interactive choices derived from a structured database, the structured database providing information for the interactive choices and on-line accessible hypertext mark-up language documents.

Another objective is to provide a computer method comprising the steps of analyzing a structured database that supports interactive voice response users; and generating links to the structured database based on the database analysis, the links being usable for on-line users.

Another objective is to provide a system comprising at least one structured database; an on-line server, electronically linked to the at least one structured database and allowing the system to support on-line users by using information in the at least one structured database; and an interactive voice response server, electronically linked to the at least one structured database and allowing the system to support customers connected to the interactive voice response server by using information in the at least one structured database.

Another objective is to provide a system comprising at least one structured database; an on-line server, electronically linked to the at least one structured database and allowing the system to support on-line users by using information in the structured database; and an interactive voice response server, electronically linked to the on-line server, the system analyzing a menu structure supporting the on-line users and creating an interactive voice response menu structure to support a user connected to the interactive voice response server.

Another objective is to provide a system comprising at least one structured database; and a server, the server electronically linked to the at least one structured database and allowing the system to support on-line users by using information in the at least one structured database and the server electronically linked to the at least one structured database and allowing the system to support customers connected to the server by using information in the at least one structured database.

Another objective is to provide a system and method to analyze a menu structure that supports interactive voice response users and generate a graphic representation of the menu structure using the analysis. The graphic representation of the menu structure is usable for on-line users and allows the system to make a telephone connection of an on-line user to a choice on the graphic representation of the menu structure. The system makes the telephone connection by either replicating the choices of the interactive voice response menu, or bypassing the choices and direct dialing to the desired choice. The system dials with a TAPI interface, or a form of Internet telephony.

DETAILED DESCRIPTION OF THE INVENTION

Figure 7:
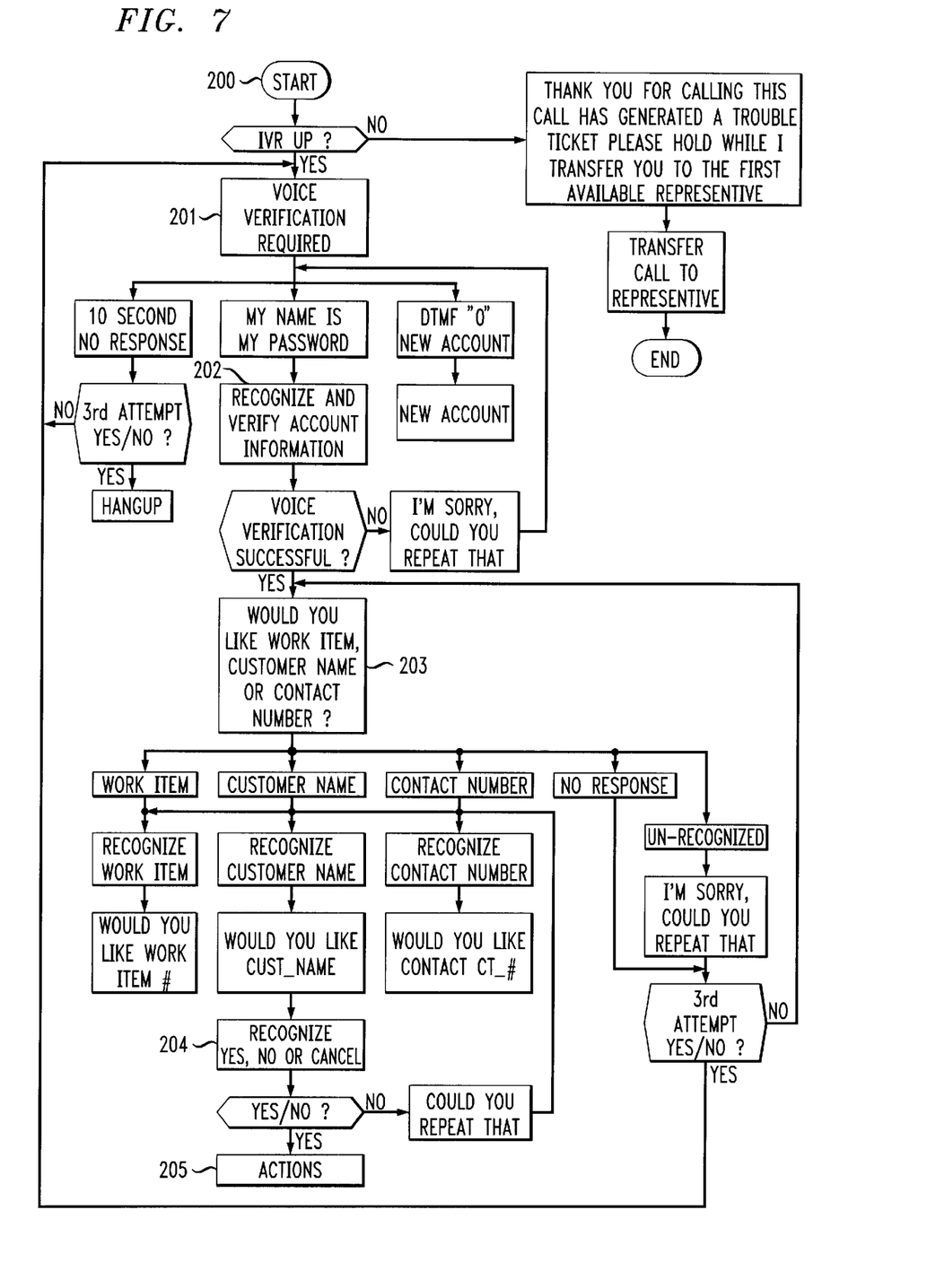
FIG. 7 illustrates an IVR system.

Interactive voice response (IVR) provides automated access to customers and business representatives by responding to keypad entries or spoken words. FIG. 7 illustrates the initial access steps of a typical IVR system supporting business representatives.

At step 200, the business representative establishes initial contact with the IVR system.

At step 201, if the IVR system is operating, the system requires voice verification or entry of "0" for a new account.

At step 202, after the representative provides a password, the IVR system verifies the voice password.

At step 203, if the password was correctly verified, the IVR system prompts the representative for a work item, a customer name or a contract number.

At step 204, the IVR system verifies that it has correctly interpreted the desired item.

At step 205, the IVR system provides the representative the opportunity to take action on the selected item.

The IVR system additionally provides looping functions when the representative's response is not understood, or where a response is not received within a specified time period. The IVR system illustrated in FIG. 7 is designed to support the initial access by a business representative. Other IVR systems support telephone sales and voice-mail systems.

For many companies, a substantial business sector relies on customer-merchant relationships that are not face-to-face. Some of these relationships take the form of catalog sales and on-line sales. Catalog sales rely heavily on telephone ordering, and companies with a substantial catalog sales volume develop sales and information architectures that specifically support telephone ordering.

Companies with substantial catalog sales volume must also balance the need for live telephone sales staff against their expense. Interactive automated techniques are usually less expensive and where automated customer sales and support can provide satisfactory response to the customer, the companies will use interactive automated techniques. These interactive automated techniques include computer generated voice response menus designed for interactive customer response. Just as for other IVR systems, catalog sales interactive techniques use touch-tone telephones and voice responses.

Though businesses that rely on telephone ordering may not be able to completely eliminate live sales support staff in all telephone order transactions, the businesses are able to significantly reduce their sales staff size by using IVR for routine and well structured telephone ordering tasks. However, an IVR system that is able to replace live sales support staff, even during routine order processing, is difficult to establish. The system must have excellent voice response and speech generation to understand different dialects and accents and provide responsive answers. Additionally, the IVR system must have robust supporting databases containing product specifications and pricing information. These product specification and pricing databases are frequently unique to IVR systems and not well adapted to other business purposes.

A business with an established telephone catalog order sector, using IVR, spends considerable expense developing and maintaining databases. Given the substantial startup cost to establish IVR, only large businesses use IVR and are able to reap the reduced cost benefits.

Today, many businesses are establishing an on-line electronic sales presence with Web pages that list product specifications and prices. The Web pages typically include images representing product with textual descriptions. On-line ordering is also available and companies develop and place forms on their Web pages to automatically process on-line customer orders.

With extensive product lines, companies typically shift from static HTML content on their Web page to dynamic HTML content. With static HTML, all the Web page information is known and coded when the Web page is developed. This is a reasonably inexpensive though time-consuming process. Once developed, a static HTML Web page does not allow rapid change or update. Further, a static HTML Web page does not readily support short duration events like sales, because each Web page must be changed and checked before the sale event and after the sales event.

With dynamic HTML, the basic Web page format is developed, but the actual HTML page content is extracted from databases at the time the customer accesses the uniform resource locator (URL) of the Web page. In this manner, the business makes changes to their databases, which are used to generate the HTML documents of the Web page. Changes to databases are much easier to accomplish and can be completed in near-real-time. Thus, short duration events, like sales, become possible with an on-line Web business using dynamic HTML.

The information needed to support on-line electronic sales and telephone catalog ordering is very similar and in may cases is identical. The customer needs ready access to accurate and up-to-date product specification, availability and price. Many businesses are willing to invest the expense required to establish and maintain structured databases for an on-line electronic sales presence on the Web, but do not have IVR for their telephone based catalog ordering. Additionally, many customers are not confident in the security of on-line electronic sales ordering and will search for product on-line, but place their order using the telephone. Thus, the ability to adapt and use structured databases that are developed for on-line sales to support IVR is very beneficial. The business is able to take advantage of the previously developed and maintained on-line databases and Web menu structure by using the same menu structure and databases as the foundation for IVR telephone sales. As a result, the business reduces their expense for live telephone sales support staff and eliminates inconsistencies when a customer searches for a product on-line and places the order by phone.

Most on-line Web based sales and most IVR systems use a hierarchical menu structure. This structure allows the customer to rapidly locate desired products and services. Once the customer has generally located the desired product or service, the menu structure allows the customer to learn about the product. For clothing, the system typically provides sizing and color information with availability of the desired combination. Product prices are also provided. On-line systems typically provide a representative image of the product. Once the customer decides to purchase a particular product, systems allow the customer to add products to a "shopping cart" until they decide to check-out and pay for their purchases.

Figure 1:
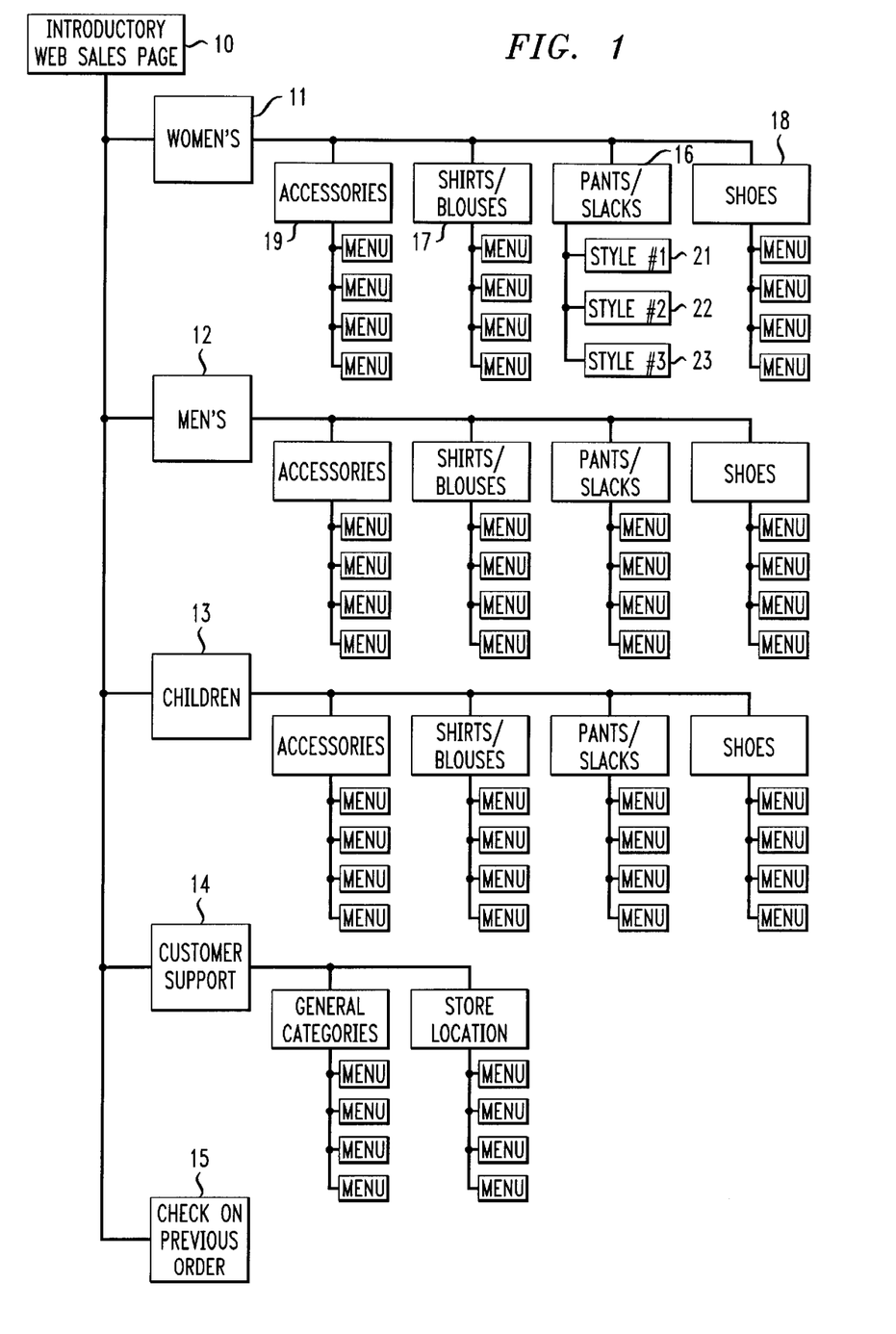
FIG. 1 illustrates an on-line Web sales menu architecture.

An example of the menu structure for an on-line Web based clothing sales company is illustrated at FIG. 1. Among other options, the introductory screen 10 allows the customer to check on previously placed orders 15, and contact customer assistance 14 where they can find telephone contact information, store locations, and general categories of product. The customer is also able to move directly to major product categories of Women's clothing 11, Men's clothing 12 and Children's clothing 13. Once in the major product category, the customer is provided additional product category options, such as Pants 16, Shirts 17, Shoes 18 and Accessories 19. The product categories are further subdivided and may contain forms or individual pages 21, 22, 23.

Using a menu structure like FIG. 1, with links between on-line Web databases and inventory/shipping databases, the customer receives near real-time information on product availability with current pricing. The business is also able to automatically process orders and track inventory.

With a well developed and designed on-line Web sales architecture, the personnel costs for a business are very small. Personnel are still required for quality assurance and physical actions such as shipping and receiving. However, the need for live sales support staff can be significantly reduced or minimized.

Figure 2:
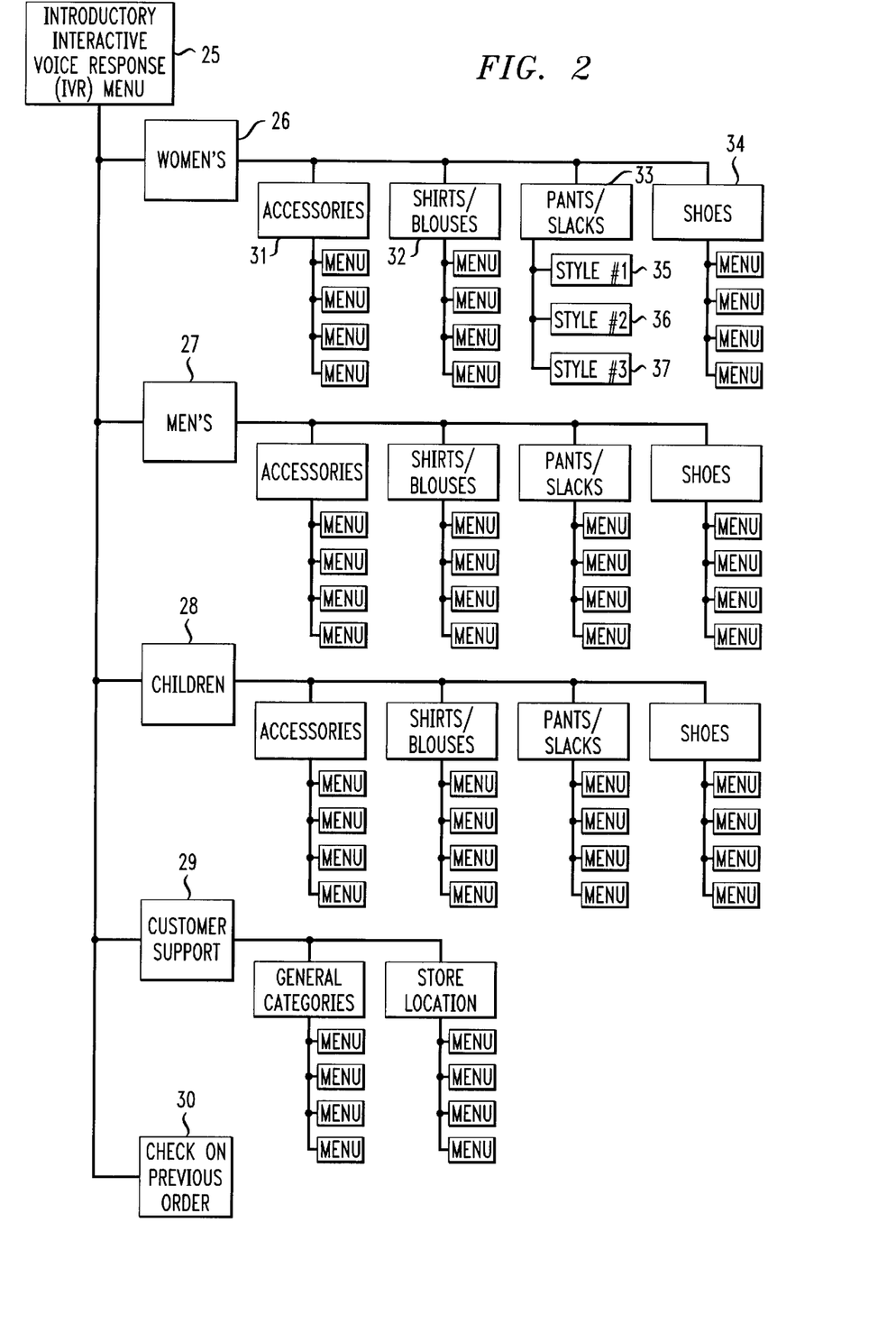
FIG. 2 illustrates an Interactive Voice Response (IVR) sales menu architecture.

FIG. 2 illustrates a typical menu structure for IVR telephone product sales. In the initial IVR menu 25, the customer hears about the top level choices. These choices include checking on a previous order 30, contacting customer support 29, or moving directly to the main product categories, such as women's clothing 26, men's clothing 27 or children's clothing 28. The main product categories are farther subdivided into areas like accessories 31, blouses 32, slacks 33 and shoes 34. There may be further subdivisions or menus 35, 36, 37.

As thus described and illustrated in FIGS. 1 and 2, the menu structures for IVR telephone sales and the on-line Web sales may be similar or identical, illustrating the benefit of linking the supporting databases. However, merely linking the supporting databases does not reduce the up-front development costs for IVR. Providing a system and method to analyze the on-line Web sales database and menu structure and adapting that database and menu structure to build an IVR system is beneficial.

HTML Web pages that use forms and structured databases adhere to predictable standards. This is particularly true when the HTML pages are created with Web page authoring applications. These authoring applications adhere to the HTML standards and produce repeatable HTML structure that lends itself to automated analysis.

Figure 3:
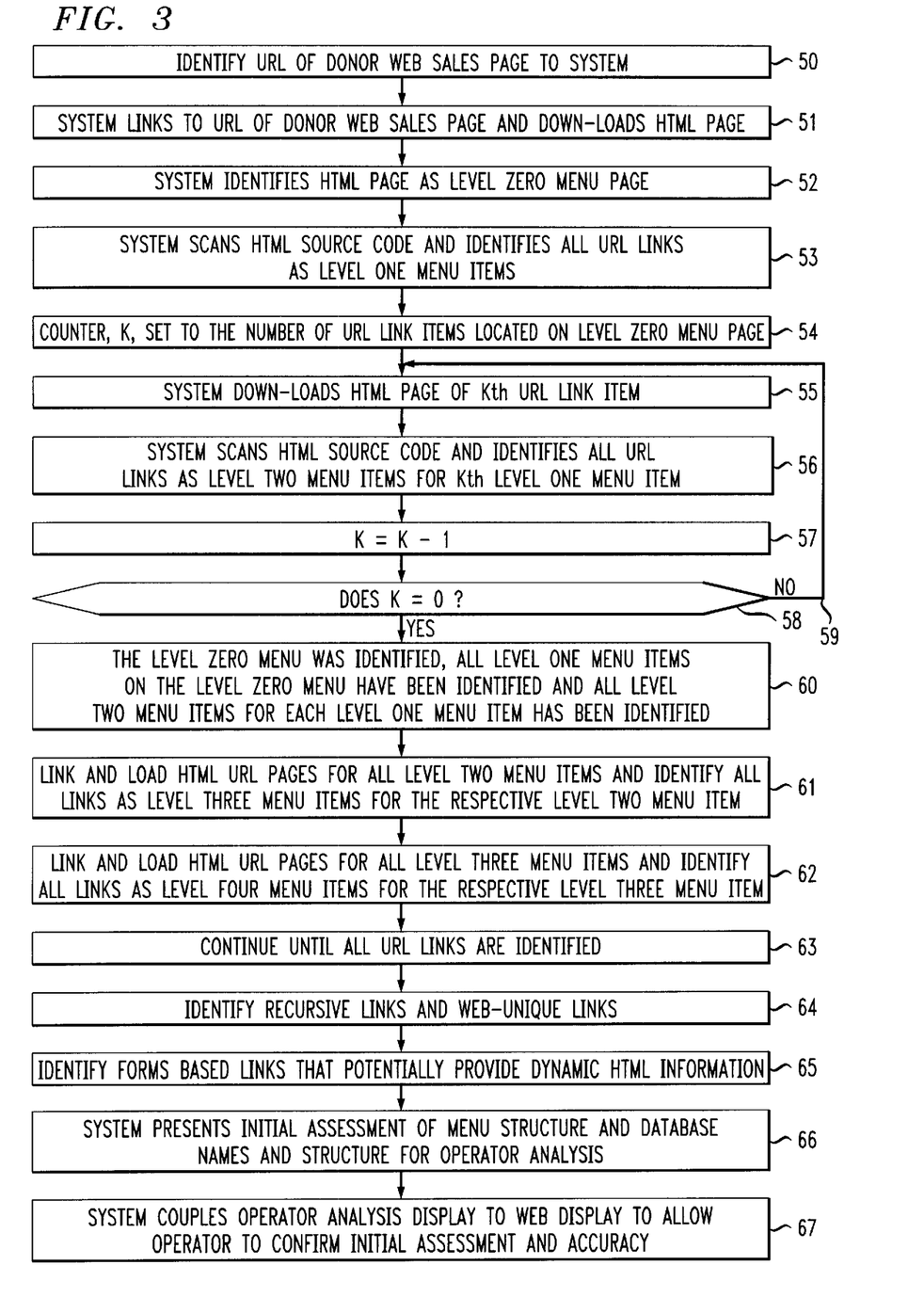
FIG. 3 illustrates steps for translating a Web on-line sales menu to an IVR menu architecture.

Referring to FIG. 3, at step 50, a previously developed Web page on-line sales site is identified as suitable for IVR and telephone sales. Using the Uniform Resource Locator (URL) of the Web page, the system begins an initial analysis.

At step 51, the system links to the URL of the donor Web page and down-loads the HTML document that generates the home page. This step of down-loading is the same or identical to the down-loading that occurs when a Web browser links to a specified URL and down-loads an HTML document associated with that URL.

At step 52, the system identifies the down-loaded HTML page as the level zero menu page.

At step 53, the system scans the HTML source code and identifies every URL link contained within the HTML level zero menu page as a level one menu item. Though some links, such as links to the webmaster, may not be appropriate for an IVR system, at step 53, it is not necessary for the system to differentiate between different links.

At step 54, the system sets a counter, K, to the number of URL links identified on the level zero menu page.

In steps 55 through 59, the system begins a systematic loop to down-load the HTML page for each of the K URL links identified on the level zero menu page.

At step 55, the system down-loads the HTML document associated with the Kth URL link item. This down-loaded HTML page is a level one menu page.

At step 56, the system scans the HTML source code of the level one menu page and identifies each URL link. Each URL link identified at step 56 points to a level two menu item.

At step 57, the system decrements the counter K, by one.

At step 58, the system checks to determine whether K is zero, indicating that the system has down-loaded all URL links for that level menu page.

At step 59, if K is not zero, the system loops to step 55 and down-loads the next URL link.

After the system has down-loaded all URL links for that level menu page, the system leaves the loop.

At step 60, the system completes the identification of the level zero menu by identifying all level one menu items on the level zero menu. With the loop of steps 55 through 59, the system also identifies all the level two menu items on each of the level one menus.

At step 61, the system similarly identifies and down-loads the HTML documents associated with each URL link on the level two menu pages. The links are level three menu items. Though the individual steps are not illustrated, the system uses a process similar to that illustrated in steps 53 through 59.

At step 62, the system similarly identifies and down-loads the HTML documents associated with each URL link on the level three menu pages. The links are level four menu items. The steps are similar to those illustrated in steps 53 through 59.

At step 63, the system continues the process until it has identified all UTRL links that branch from the level zero menu page identified in step 52.

Though not illustrated in the example, as the system identifies URL links and down-loads HTML documents associated with the URL link, the system does not blindly follow every link. Links that point to URLs located outside the company business area are considered suspect links. For example a company Web sales page may have a URL link to the home page of a product manufacturer. The system does not follow that link. Instead, the system marks the URL link as such and moves on to the next URL link.

At step 64, the system performs a clean-up of the links and data. For example, on some web pages, there may be links that become recursive, linking back on themselves. At step 64, the system identifies these recursive links and marks them as such. The system also identifies Web unique types of links that do not readily translate to IVR and marks them as such. Examples of these type of unique links include mail to: links that send e-mail to Web-masters. However, a mail link to the customer service department is not unique and the system will translate that type of link to a telephone link.

As the system identifies URL links and down-loads associated HTML documents, some will include Forms-based HTML pages. At step 65, the system uniquely identifies these Forms-based links for IVR database needs.

At step 66, the initial automated analysis is complete and the system provides an operator with a visual representation of the menu structure identified during the Web page analysis. This visual representation includes identification of links outside the business area, recursive links, Web-unique links and questions. The visual representation also includes an identification of the Forms-based links and the supporting databases for dynamic HTML pages.

At step 67, the system gives the operator an opportunity to verify the analysis by tracking through the Web page and site to resolve questions on the analysis.

Once the operator is satisfied with the basic translation of Web menu architecture to IVR menu architecture, the system creates an IVR outline. This is further illustrated on FIG. 4. At step 70, the system uses the operator validated menu structure and database linkage to create the initial IVR menu structure and proposed IVR prompts.

Figure 4:
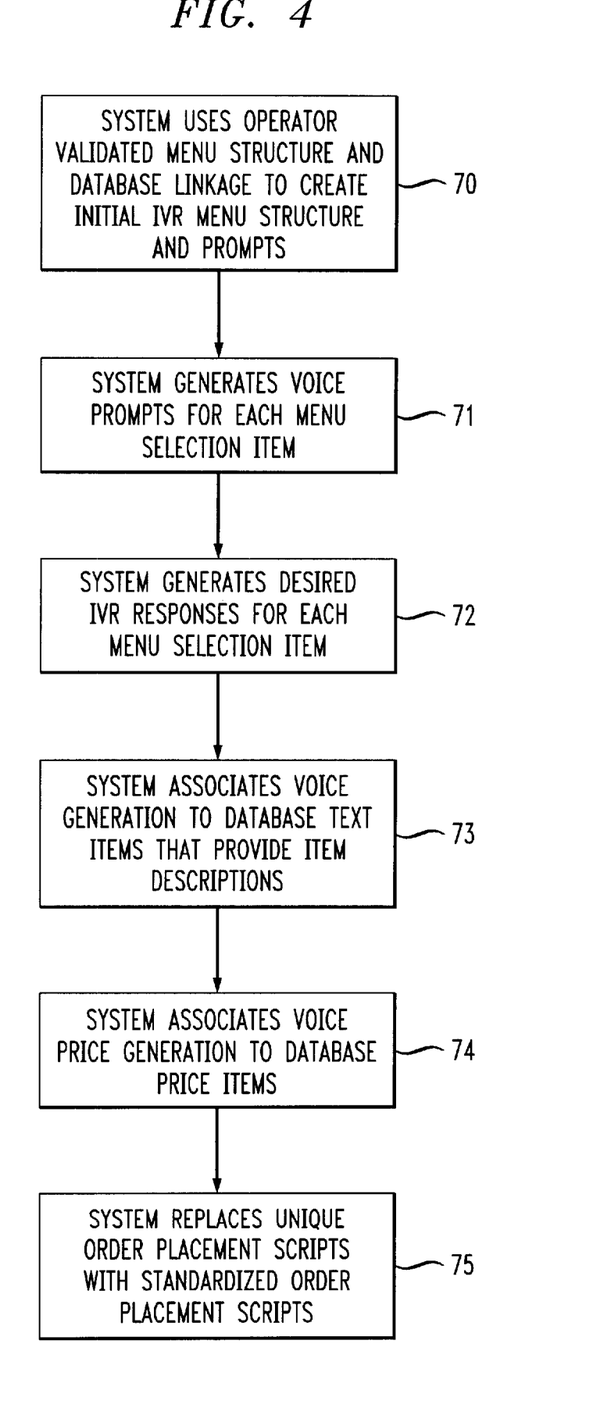
FIG. 4 illustrates steps for translating a Web on-line sales menu to an IVR menu architecture.

At step 71, based on the proposed prompt, the system generates voice prompts for each menu item in the IVR.

At step 72, the system generates desired IVR responses to each prompt on the menus.

At step 73, the system associates voice generation to database text that provides an item description. For example, with a Web site that includes a text description of the product, the system will link a voice generation system to that text description database item. In this manner, the system uses the textual description contained in the database to generate a spoken description of the item.

At step 74, in a similar manner, the system associates voice price generation to database price items.

At step 75, the system replaces order placement scripts from the Web page with IVR developed order scripts. This helps to ensure consistency in the order placement and takes advantage of time already spent developing efficient IVR for order placement.

Once the IVR menu structure, prompts and responses are developed, the system has completed the initial translation.

Figure 5:
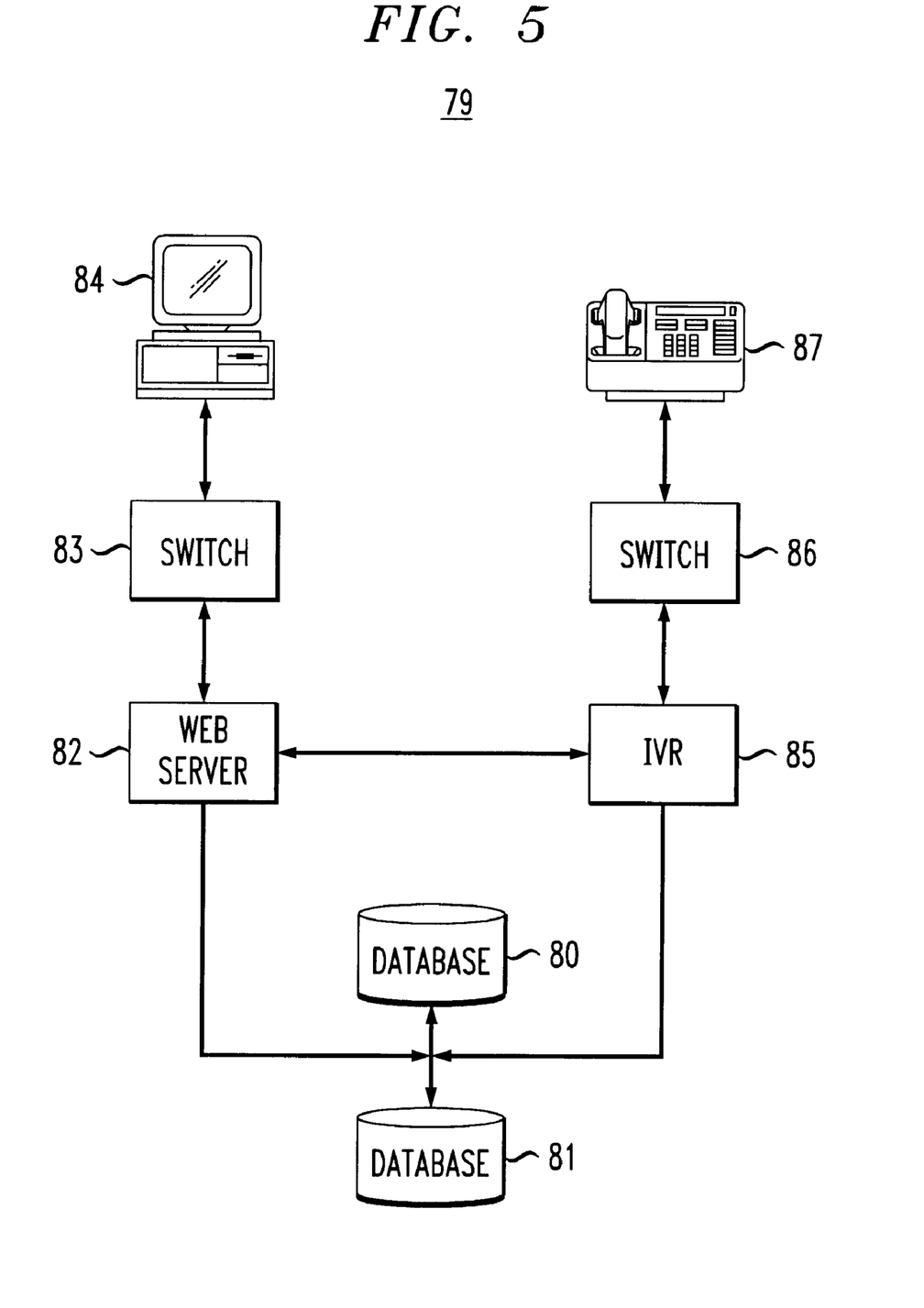
FIG. 5 illustrates a development system of the invention.

For translation and interpretation of Web menus, system 79 is illustrated in FIG. 5. An on-line Web-based electronic sales system, taking advantage of forms-based HTML Web pages, uses a variety of structured supporting databases 80, 81. One structured database includes the static content of the HTML documents 80, and another structured database 81 which includes information used with dynamic HTML such as product description and pricing. These two structured databases are accessible to a Web server 82 which is registered as the homepage URL and includes the addresses of all URLs within the Web sales architecture. The server functions as the homepage URL and URL of all linked pages. The HTML documents and information in databases 80 and 81 are thus associated with the URLs.

The system also includes a first switch 83 providing accesses (not illustrated) to Web server 82.

An individual computer 84 is electronically linked to Web server 82 via first switch 83. These elements of the system are typical of the configuration used for Web on-line access.

The system 79 also includes elements supporting IVR. These IVR support elements include an IVR 85 which is electronically linked to Web server 82, thereby allowing direct exchange of information and commands between Web server 82 and IVR server 85.

A second switch 86 providing support for IVR operation is linked to IVR server 85 and provides a connection path for telephone 87 to IVR server 85.

System 79 allows an operator, with access to computer 84 and telephone 87, to monitor the automated translation of the Web menu structure to an IVR menu structure with prompts and responses. System 79 also allows the operator to modify the proposed IVR structure and resolve questions.

As system 79 performs steps 50 through 75 on FIGS. 3 and 4, the operator is able to visually monitor the progress on computer 84 as the system translates the Web menu structure and develops the IVR menu structure. System 79 also allows the operator to test the IVR structure using telephone 87 and resolve problems by referring to the Web menu structure on computer 84. The system also provides access to the structured supporting databases 80, 81 allowing the operator to test changes to the database to determine whether the IVR responds appropriately.

After system 79 translates the Web menu structure and develops the IVR system, the operator validates the translation and provides any required changes. The validated IVR system is then placed in operational service along with the Web on-line system for customer service. This is illustrated in FIG. 6 with system 99.

Figure 6:
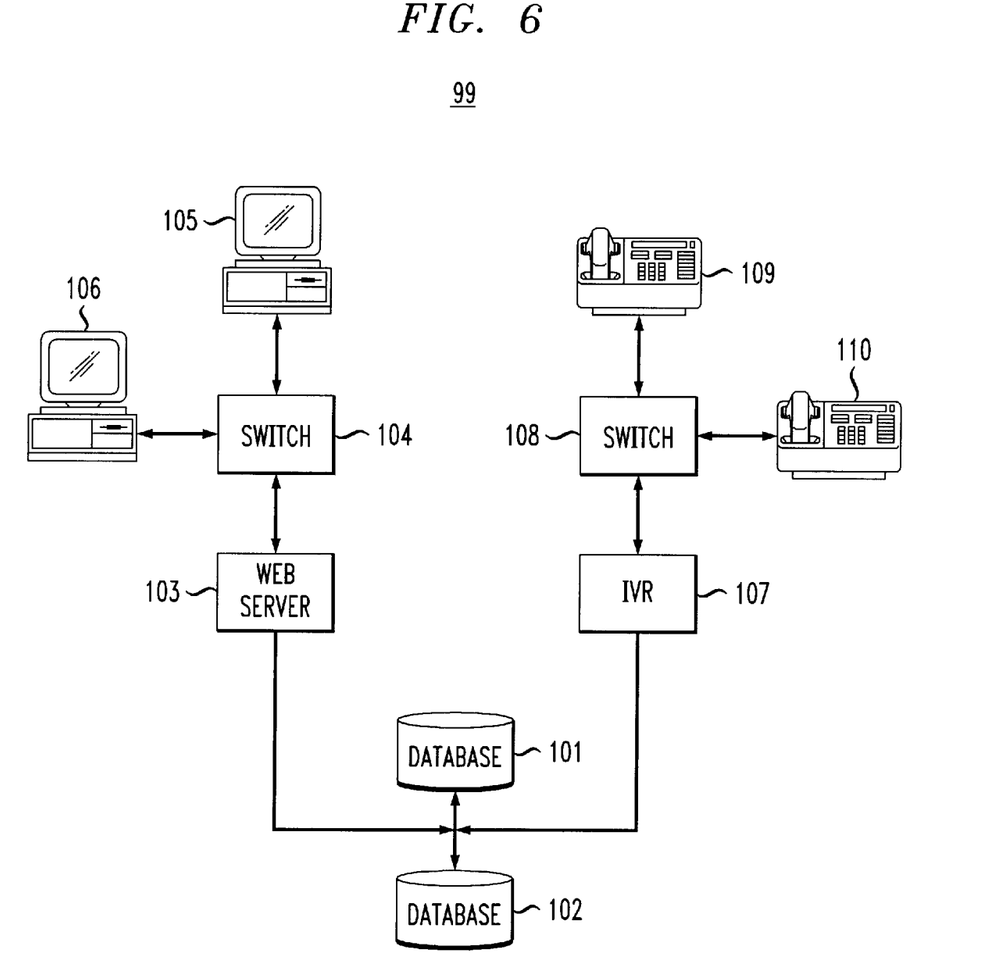
FIG. 6 illustrates an operational system of the invention.

In FIG. 6, system 99 uses common structured databases 101 and 102 as the information source for Web on-line services and IVR services. On-line customers access the Web page by using the URL of the Web page to connect individual computers 105, 106 to the Web server 103 through a switch 104. Once connected, the customer is able to browse the Web site and access information on products. The information is contained in structured databases 101 and 102 and is linked to the Web pages using dynamic HTML by the Web server 103.

In a similar manner, system 99 uses the same common structured databases 101 and 102 as the information source for the IVR service. Telephone customers dial the access number of the IVR service using telephones 109 and 110. They are connected to the IVR server 107 by switch 108. IVR server 107 provides IVR prompts based on customer responses and information in databases 101 and 102.

As illustrated, databases 101 and 102 contain product specifications and pricing information. Thus, common database information supports both the Web on-line service and the IVR service.

In FIG. 6, first switch 104 and second switch 108 of system 99 are illustrated as individual elements, but they can be a single element providing switching between the appropriate users and servers. Similarly, Web server 103 and IVR server 107 are illustrated as individual elements, but a single server can be partitioned to perform the required functions of each.

In FIGS. 5 and 6, the servers, switches and databases of systems 79 and 99 are labeled with unique numbers. Separate systems segregate the development system from the operational system. However, a single system can be used for both the development system and the operational system.

The system and method are described in the context of using previously developed on-line structured databases, such as for Web sales, as the basis for IVR telephone sales structured databases. The converse is also possible, where a company uses its structured IVR database as the basis for automatic generation of an on-line Web sales database.

In a method similar to the method just described, translation of an IVR menu architecture to a Web page architecture requires analysis of the IVR menu, and creation of Web pages corresponding to different menu levels in the IVR. Translation also requires creation of the link relationships between the Web pages corresponding to IVR choices and responses. The systems illustrated in FIGS. 5 and 6 are used to translate IVR menus to Web menus.

Referring to FIG. 2, the system creates a home page using the introductory IVR menu 25. The introductory IVR menu includes prompts and non-response information. The home page includes this non-response information, such as the company name or welcome message, which is extracted from the IVR introductory menu. Though a completed Web page may not contain this information, the information does provides a good default for content of the Web home page.

The IVR introductory menu 25 also contains prompts or choices 26, 27, 28, 29, 30 which relate to other IVR menus or actions. Thus, each of the IVR choices presented in the introductory IVR menu 25 becomes a link to another Web page or service from the Web home page. In the same manner illustrated in FIGS. 3 and 4 and described above, where the system systematically analyzed the Web menu architecture to create an IVR menu architecture, the system systematically analyzes the IVR menu architecture and creates a Web page architecture with a home page and linked pages. IVR prompts, choices and responses define the links to and between Web pages. In a manner described in greater detail below, IVR choices that connect to live sales or support staff become either "Click-to-Dial" telephone links on the Web page, or e-mail responses.

After the initial Web page structure is created, the system allows an operator to add graphics and text enhancements to the Web pages. The system also allows an operator to modify the Web page structure if the initial structure is not appropriate.

Taking advantage of a system and service termed "Click-to-Dial", a Web page may contain a link to automatically initiate a telephone connection between a personal computer user accessing the Web page and another party. This "Click-to-Dial" or "Click-to-Talk" service appears as a link on the Web page. However, when activated, this service establishes a voice telephony connection to the person accessing the Web page. As an example, when a user accesses an AT&T Web page there is a link area on the Web page, under the heading "Ask about your bill." The user enters their telephone number in a box on the Web page and clicks on the link. In response, AT&T automatically establishes a callback to that telephone number, which is handled by an AT&T service representative. Once the call-back is established, the service representative can discuss the person's account, and can even send specific web pages or information to the user for viewing and discussion during the telephone call.

Figure 8:
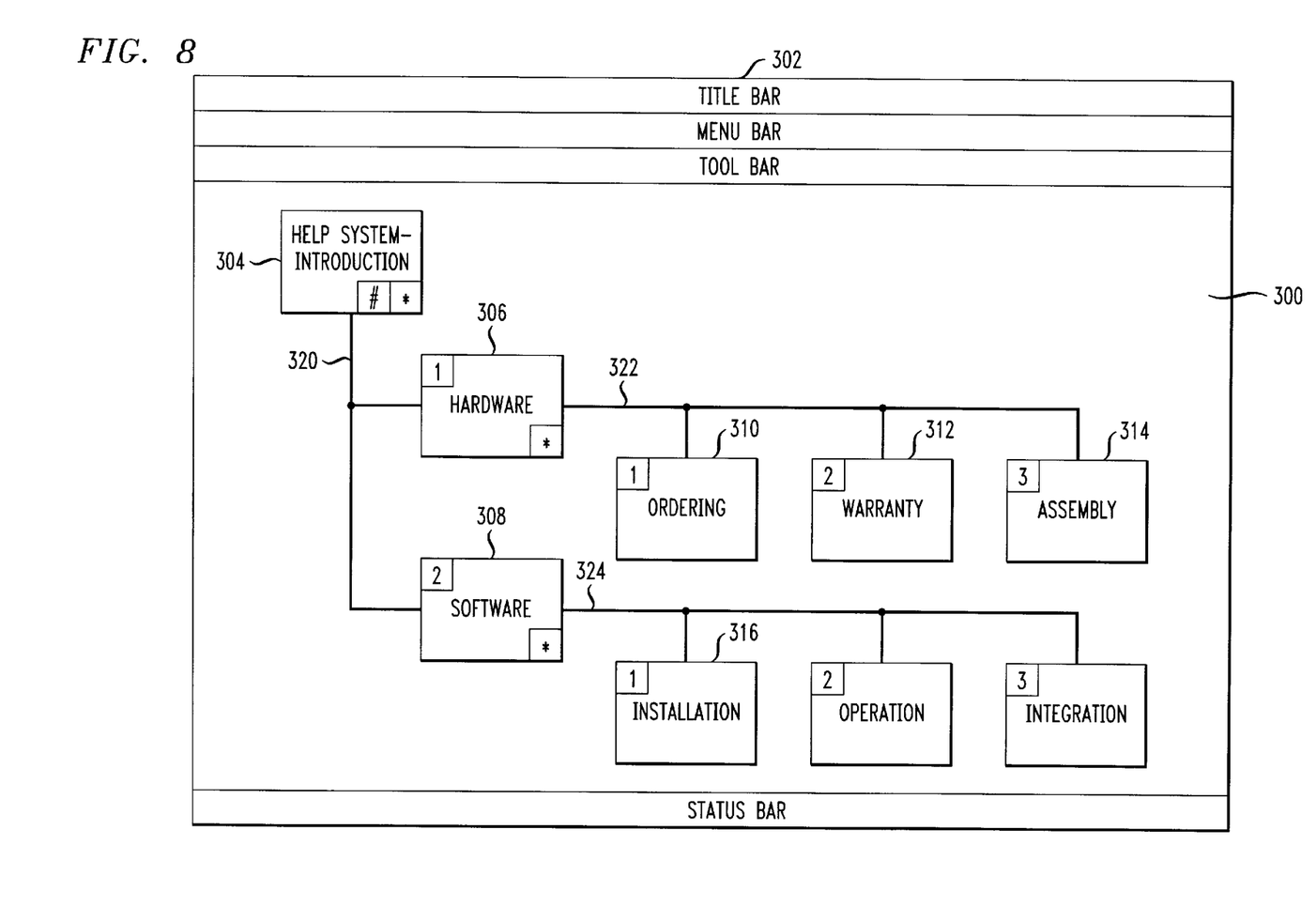
FIG. 8 illustrates a Web page depiction of an IVR menu architecture.

Referring to FIG. 8, another embodiment is illustrated. A Web page 300 is displayed by a browser application 302 on a video display terminal such as the video display terminals of computers 84, 105, 106 of system 79 and 99. The Web page display provides a graphic representation of an IVR menu architecture. The graphic representation is generated by system 79 or 99 by analysis of the IVR menu architecture, as previously described. However, where the analysis of the IVR menu architecture previously described produced a series of Web pages with links between the Web pages corresponding to different IVR menu choices, the Web page display of this embodiment graphically represents the entire IVR menu architecture on a single Web page. Though the display in FIG. 8 is a graphic representation, it can be a purely textual representation with different menu levels represented by varying indentation.

Through an analysis of the IVR menu architecture, system 79 or 99 identifies and creates a series of nodes 304, 306, 308 and linkages connecting the nodes 320, 322, 324. Each node represents an IVR menu prompt. The linkages represent the various possible response prompts for the node. IVR systems frequently allow forward and reverse navigation through the IVR menu architecture, so users can go up or down the menu hierarchy to reach different branches without terminating a call. Therefore, the IVR menu prompt for Hardware will include choices for selecting ordering 310, warranty 312 and assembly 314 which are selected by the user by entry of the numbers 1, 2 or 3 respectively on the keypad.

Thus, a user calling the IVR Help system that is graphically represented in FIG. 8 initially dials a telephone number and hears an introductory welcome message and hears a series of prompts for different responses. That introductory message and prompts are graphically represented by node 304 in FIG. 8. In the example, the user has selection choices of Hardware or Software. When these choices are presented by an IVR system alone, the user hears a description of those two choices and responds by either speaking the desired choice ("one" or "two"), or selecting the desired choice by pressing either the 1 or 2 key on the telephone keypad. System 79 or 99 graphically represents the introductory welcome message and choices with nodes 304, 306, 308 and linkage 320. Similarly, system 79 or 99 graphically represents the description and choices for the Hardware prompt 306 and associated choices with nodes 304, 310, 312, 314 and linkages 320, 322.

It should be noted that because an IVR menu system allows a user to move up and down the menu structure, the Web page representation similarly maintains those relationships. In the IVR environment, a user may move up and down the IVR menu hierarchy. For example, return to the previous menu is accomplished by entry of * or some other choice on the keypad. In this manner, if the user determines that the choice is not the correct choice, they can backup to a previous menu rather than hang-up and redial. For example, if the user is at node 306 in the IVR menu as represented in FIG. 8, they will go back up the IVR menu to the main menu 304 if they press *. Most IVR systems also allow a user to return to the main entry menu by selection of a choice like # or 9. Thus, if the user is at node 314 in the IVR menu as represented in FIG. 8, they will go to the main menu 304 by pressing #. This navigation functionality is maintained in the invention.

Though not illustrated, it is also possible that an IVR system will allow a user to reach the same service representative by multiple paths. The Web page duplicates that architecture and illustrates the relationship between nodes with linkages.

In this manner, the Web page graphically represents the IVR menu architecture by providing an overview of the entire IVR menu architecture on a Web page. By presenting this type of overview, a user is able to visually determine how the IVR choices and responses, represented by nodes and linkages, are interrelated and whether a particular series of responses will lead to the desired service representative.

For most IVR systems, the user is only able to interact with a service representative at a termination point following responses to a series of choices. For example, with the IVR menu architecture that is graphically represented in FIG. 8, a user who dials the main IVR telephone number will hear an initial IVR prompt and respond to the choices in an introductory welcome menu. Based on whether they select the Hardware or Software choice, the user will next hear an IVR prompt and respond to the choices for their selected Hardware or Software choice. It is only after this selection that the user is connected to a service representative. Though the example in FIG. 8 has three menu levels, IVR systems frequently have multiple menu levels before reaching a service representative. Thus, a user who is uncertain as to which series of choices will take them to the desired service representative can become lost or discouraged as they navigate through the choice and response maze.

With a graphic representation of the IVR menu architecture, such as provided in FIG. 8, the user is able to visually determine the particular choices necessary to reach a desired service area. In addition, when system 79 or 99 creates the Web page representation of the IVR menu architecture using interactive links, a user can directly select the desired service area from the Web page. For example, a user who has a software installation problem can view the IVR menu architecture illustrated in FIG. 8 and determine that the desired service representative is at node 316. If the user places their Web cursor over that node they can receive additional descriptive information such as through pop-up text boxes, mouse-over text boxes or right-click action. If the user selects that node, the system will connect the user to that service representative.

This connection to the service representative is accomplished in a number of different ways. In one method, system 79 or 99 automatically dials the main IVR menu number, represented by node 304. Then, knowing that the desired software installation node 316 is connected to the software node 308 which is connected to the introductory node 304, the system automatically enters the appropriate response to select the software node, followed by the appropriate response to select the installation node.

With the IVR system alone, if the user selects the hardware response by pressing the number 1 on the keypad and the software response is selected by pressing the number 2 on the keypad, then system 79 or 99 will automatically dial the main access telephone number for node 304 followed by the number 2, to automatically select the software node 308. System 79 or 99 then further dials the number 1 to reach the installation representative at node 316. In this manner, system 79 or 99 takes advantage of the IVR menu architecture and automatically navigates that IVR menu architecture to connect the user with the desired service representative. In this manner, system 79 or 99 automatically replicates the IVR choices. Replication of IVR choices is described in greater detail below.

In another embodiment, the termination point nodes represented in FIG. 8 have a direct access telephone number. Thus when the user selects the software installation node 316 on the Web page, system 79 or 99 dials the direct access telephone number for that service representative. In this manner, system 79 or 99 automatically bypasses the IVR choices.

These embodiments are particularly advantageous when the number of choices and responses in the IVR menu before reaching the desired service representative is lengthy and the system must wait for each IVR prompt before automatically selecting the appropriate response. In this manner, system 79 or 99 can either emulate or bypass the IVR choices.

Figure 9:
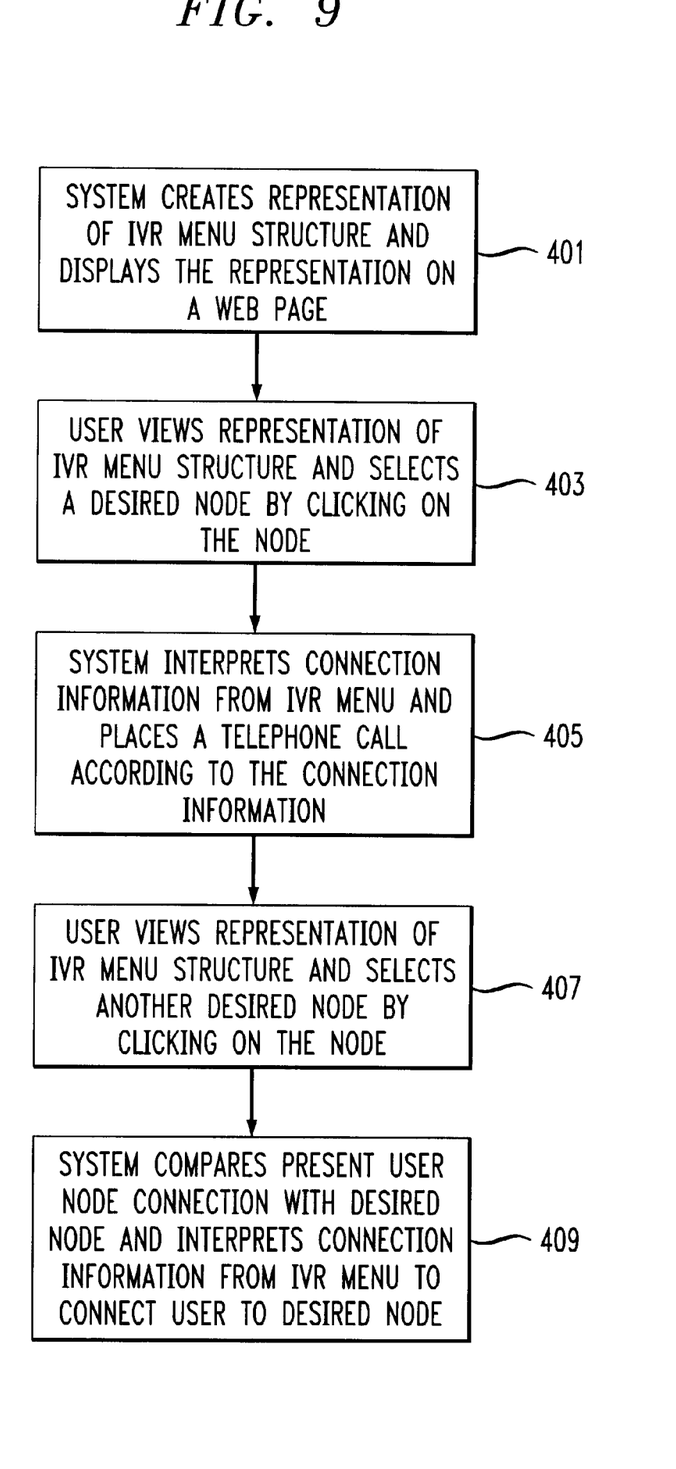
FIG. 9 illustrates steps for connecting to different nodes of an IVR menu that is displayed on a Web page.

Referring to FIG. 9, at step 401, the system interprets the IVR menu architecture and creates the graphic representation of the IVR menu on the Web page 401. An example Web page is displayed in FIG. 8.

At step 403, the user views the representation of the IVR menu, identifies and selects a desired node by clicking on that node. In the example Web page of FIG. 8, this could be accomplished by placing a cursor over node 316 to learn more about the node through a mouse-over text box and then double-clicking the node.

At step 405, the system interprets the connection information from the IVR menu and places a telephone call to the service associated with that node. Thus, using the example of FIG. 8, the system uses the information from the IVR menu analysis and the user selection to automatically dial the main IVR telephone access number that is associated with node 304. Next the system dials the number 2, to reach node 308 and finally dials the number 1 to reach the installation node 316. These telephone connections are placed using a TAPI connection or Internet telephony connection.

With a TAPI connection, the system takes control of an attached telephone handset and automatically dials the main menu access telephone number (node 304), waits until a connection is established and the IVR system is prepared to accept selections, automatically dials the number 2 (node 308), waits until the IVR system is again prepared to accept selections and then dials the number 1 to connect to the software installation node 316. The user conducts the telephone call with the telephone handset.

With an Internet telephony connection, the system uses an Internet connection to connect to a server that provides Internet telephony services. Once connected, that server makes the telephone connection much like the TAPI connection by automatically dialing the required IVR numbers. However, the user conducts the telephone call using the multi-media features of the computer rather than a telephone handset. For example a microphone and speakers attached to the computer become the functional equivalents of the telephone handset. The user speaks into the computer microphone and hears the conversation over the computer speakers.

It is also possible that a user will not wish to place a call at that time, or wishes to record the IVR responses for later use. The system displays the sequence of access numbers on the screen, or stores them to a user address book or a personal digital assistant for later use.

At step 407 in FIG. 9, after the user has reached node 316, they may determine that they want another node. In one form of IVR, the final choice in a tree structure connects with a live service representative. In this form, the user must generally re-dial the main number to reach another service representative, though some IVR systems allow the user to be re-connected to the system by the service representative. In another form of IVR, the final choices in a tree structure play a recorded message or generate an automatic voice. This could occur when a user accesses a bank IVR system to determine their current balance at one choice and then shifts to another choice to transfer funds or pay bills. In this form, the IVR system pauses at the termination point and waits for the user to provide additional instructions.

Using the current example at step 407, after the user hears a recording on software installation, if they also have a warranty question, they may want to connect to node 312 of FIG. 8. In this example, the system has paused at node 316. The user moves the cursor over node 312, verifies the node action as described in a mouse-over text box, and selects the node by double-clicking on the node.

At step 409, the system compares the user's current location (node 316) with the desired location (node 312) and interprets the required actions to reach the desired node. Using the example of FIG. 8, with the user at node 316, the system determines that * will connect to node 308, then * will connect to node 304, then 1 will connect to node 306 then 2 will connect to desired node 312. Alternatively, the system can determine that from node 316, # will connect to node 304, then 1 will connect to node 306 then 2 will connect to desired node 312.

Thus, one advantage of coordinated Web and IVR menu structures is that while many people prefer the personal contact available with telephone sales, they dislike the often complex and confusing menu structure of IVR. Using related IVR menu architectures and Web menu architectures makes an integrated service much easier and more cost effective. The IVR menu architectures readily translate to Web page architectures and IVR choices or prompts that would normally connect a user to a live service representative can be implemented in the Web architecture as "Click-to-Dial" links. The method and system thus preserves personal interaction while providing a web alternative to complex IVR menu structures in order to reach a particular service or individual.

Although illustrative embodiments, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

That which is claimed is:

1. A method comprising the steps of:

analyzing a menu structure that supports interactive voice response users;

creating a web page which embodies a graphic representation of prompts contained in the menu structure;

generating links to the menu structure based on the analysis, the links being usable for on-line users;

receiving inputs from an on-line user which correspond to selection of one or more of the prompts;

linking the on-line selection of prompts to corresponding interactive voice response prompts;

connecting the on-line user to a choice of the menu structure based on the selected prompts; and selecting a representative to communicate with the on-line user based on the execution of the selected prompts.

2. The method of claim 1, wherein said step of connecting the on-line user to a choice of the menu structure is by a telephone connection.

3. The method of claim 2, wherein the telephone connection is a TAPI connection.

4. The method of claim 2, wherein the telephone connection is an internet telephony connection.

5. The method of claim 2, the connection replicating interactive voice response prompts.

6. The method of claim 2, the connection by-passing interactive voice response prompts.

7. A method comprising:

analyzing a menu structure that supports interactive voice response users;

generating a representation of the menu structure using the analysis, the representation being usable for on-line users;

connecting an on-line user to a choice on the representation of the menu structure by a telephone connection, wherein the telephone connection is a TAPI connection.

8. The method of claim 7, the connection replicating interactive voice response prompts.

9. The method of claim 7, the connection by-passing interactive voice response prompts.

10. The method of claim 7, wherein the telephone connection is an internet telephony connection.

* * * * *